United States Patent
Beeck et al.

(10) Patent No.: US 6,308,511 B1
(45) Date of Patent: Oct. 30, 2001

(54) METHOD AND DEVICE FOR COOLING GUIDE VANES IN A GAS TURBINE PLANT

(75) Inventors: Alexander Beeck; Jörgen Ferber, both of Küssaberg (DE); Jakob Keller, deceased, late of Wohlen (CH), by Maria Keller-Scharli, George Keller, Vera Keller, legal representatives

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/350,886

(22) Filed: Jul. 12, 1999

(30) Foreign Application Priority Data

Jul. 30, 1998 (DE) ............................................. 198 34 376

(51) Int. Cl.⁷ ...................................................... F02C 7/12
(52) U.S. Cl. ......................... 60/39.02; 60/39.72; 415/115
(58) Field of Search ................................. 60/39.02, 39.75; 415/115

(56) References Cited

U.S. PATENT DOCUMENTS

| 3,066,912 | * | 12/1962 | Schepper, Jr. ......................... 253/76 |
| 4,173,458 |   | 11/1979 | Stiles . |
| 5,983,623 | * | 11/1999 | Aoki et al. . |

FOREIGN PATENT DOCUMENTS

| 2514704 | 11/1975 | (DE) . |
| 3532168A1 | 3/1986 | (DE) . |
| 4422965A1 | 1/1996 | (DE) . |
| 19648380A1 | 9/1997 | (DE) . |
| 5-179993 | 7/1993 | (JP) . |
| 9-324605 | 12/1997 | (JP) . |
| 11-93689 | 4/1999 | (JP) . |

OTHER PUBLICATIONS

"Probleme der Wasserabscheidung in Nappdampfturbinen", Gloger, Bennst.–Warme–Kraft 22 No. 9, Sep. 1970, pp. 417–419.

* cited by examiner

Primary Examiner—Timothy S. Thorpe
Assistant Examiner—Ehud Gartenberg
(74) Attorney, Agent, or Firm—Burns, Doane, Swecker & Mathis, L.L.P.

(57) ABSTRACT

The temperature can nowadays be reduced by about 400° C. as a result of the cooling of the guide vane (15) of the first guide wheel. The many film bores leading outward from the guide vane (15) must therefore remain free of blockages or deposits caused by suspended matter in the cooling medium. Only pure gas must therefore be used as the cooling medium for the first guide wheel. This purpose is served by a dust separator which is designed advantageously as an axial cyclone (24, 24'). The latter has no moving structural parts, has a simple design, is therefore insusceptible to faults and can be exposed to high temperatures. The axial cyclone is a centrifugal deduster without gas stream reversal.

7 Claims, 2 Drawing Sheets

METHOD AND DEVICE FOR COOLING GUIDE VANES IN A GAS TURBINE PLANT

BACKGROUND OF THE INVENTION

1. Field of the Invention

The invention relates to a method for the cooling of guide vanes in a gas turbine plant which has a compressor, at least one combustion chamber and at least one turbine. The invention relates, furthermore, to a device for carrying out the method and to a use of the method.

2. Discussion of Background

Ever-higher temperatures are employed in order to achieve an even-greater power output, and, under these circumstances, structural parts where there is a particular requirement for efficient cooling become more and more important, so that even a reduction in the cooling effect due to the clogging of part of the cooling ducts constitutes a serious risk to such a structural part. The importance of lowering the temperature in the turbine guide assembly, and here particularly at the guide vanes of the first stage, has been known for a long time. If the aim nowadays is to achieve a lowering of temperature of, for example, 400° C. in the case of this structural part, efficient cooling, as well as a long service life, must be guaranteed.

When a gas turbine with steam cooling is started up, another cooling medium (for example air) is initially required, since there is still no steam available. When the steam circuit is then opened, the components to be cooled are already at operating temperature. The problem here is that the steam entrains suspended matter (rust, welding beads, condensation water droplets and other solids) deposited in the line network after a shutdown of the steam circuit and consequently may completely or partially clog the cooling ducts (film bores) which are at operating temperature. Moreover, entrained condensation water droplets may result in damage to structural parts to be cooled, since stress peaks may occur locally as a result of the thermal shock effect. Furthermore, entrained suspended matter may be deposited on the structural parts to be cooled, for example on bends of the ducts, and cause overheating there due to its insulating effect. It is apparent from the foregoing that, if possible, only pure gas should flow in the compressor outlet space (combustion chamber plenum). In order to achieve this, various measures have already been proposed, but these are very complicated.

SUMMARY OF THE INVENTION

Accordingly, one object of the invention is to provide a novel, improved method for this purpose. The method according to the invention is defined in that part of the crude gas flowing through the compressor is supplied to at least one dust separator, in which suspended matter is separated from the crude gas by centrifugal force, and in that the pure gas is then guided into the interior of the guide vanes of at least the first guide wheel. It is advantageous, at the same time, if the dust separator is designed as an axial cyclone.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
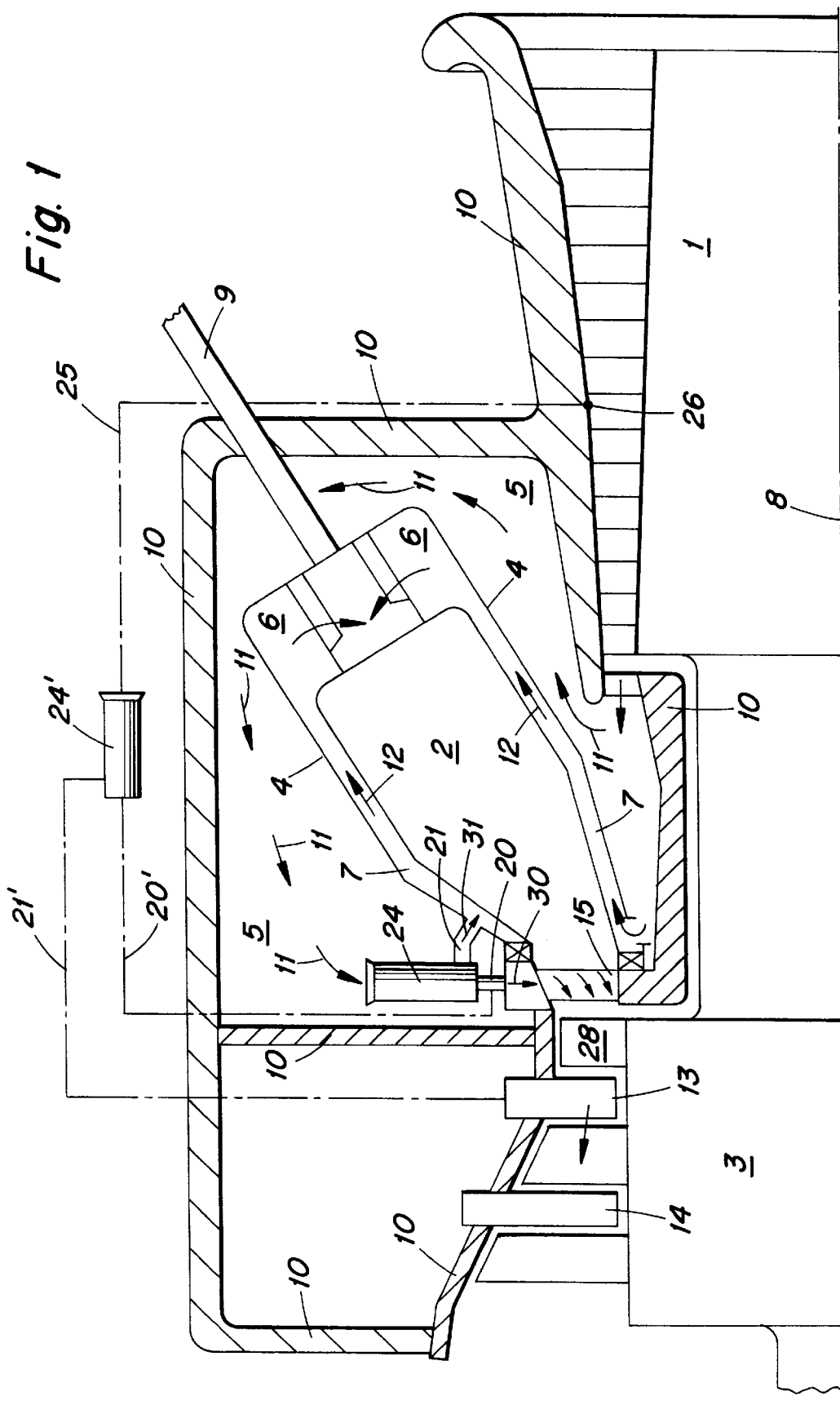
FIG. 1 shows a diagrammatic part longitudinal section through a gas turbine plant.

Referring now to the drawings, wherein like reference numerals designate identical or corresponding parts throughout the several views, the gas turbine plant according to FIG. 1 has a compressor 1, a combustion chamber 2 and a turbine 3. The combustion chamber 2 is surrounded by combustion chamber cover 4 which is located in a compressor outlet space designed as a combustion chamber plenum 5. Located within the combustion chamber cover 4 is a burner plenum 6 (burner inlet space). The combustion chamber 2 is surrounded by a cooling-air space 7. The combustion chamber plenum 5, the burner plenum 6, the combustion chamber cover 4, the combustion chamber 2 and the cooling-air space 7 are bodies of revolution about the gas turbine longitudinal axis 8. A multiplicity of individual burners 9 are arranged so as to be distributed over the circumference of the combustion chamber 2. A casing 10 is also shown diagrammatically. The impure gas (air) flowing through the compressor 1 flows partly in the direction of the arrows 11 in the combustion chamber plenum 5 and partly in the direction of the arrows 12 in the cooling-air space 7.

The guide assembly of the turbine 3 has guide vanes 13 and 14. A guide vane 15 of the first stage is also shown, which is exposed to particularly high temperatures and in which the desired cooling must therefore take effect particularly reliably. In the guide vane 15, some film bores 16 are shown (FIG. 3), out of which the cooling medium (air) therefore flows from inside the guide vane 15 radially (with respect to the longitudinal extent of the guide vane 15) and acts as film cooling along the guide vane wall. The aforesaid design of the gas turbine plant is already known.

Figure 2:
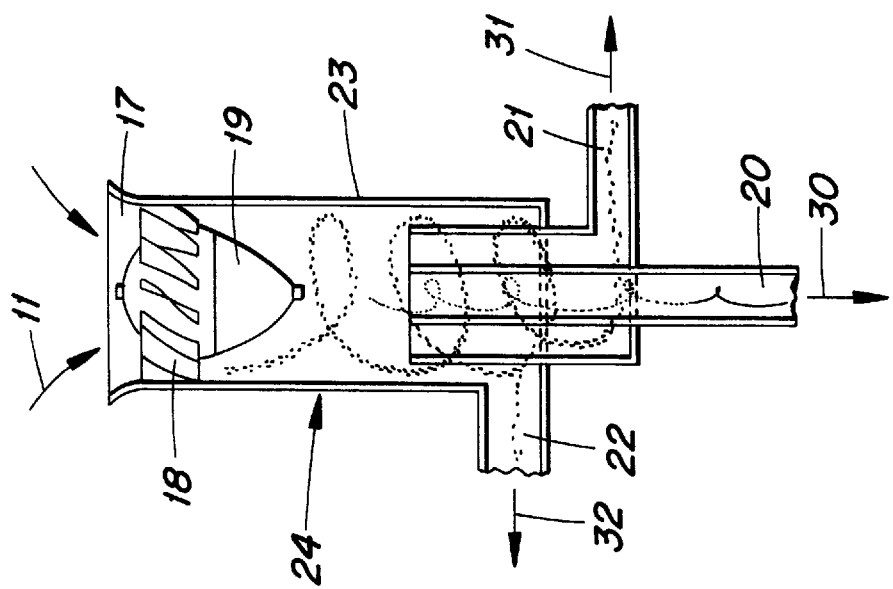
FIG. 2 shows, in longitudinal section, a dust separator designed as an axial cyclone.

In the method according to the invention, it is now proposed to use at least one dust separator which is advantageously designed as an axial cyclone 24. Such an axial cyclone (centrifugal deduster without gas stream reversal) is known per se. See, in this respect, "Leuger" Lexikon der Technik, Band 6, Energietechnik und Kraftmaschinen (Lexicon of Technology, volume 6, Power Engineering and Power Engines), Stuttgart 1965, page 81. An exemplary embodiment of such an axial cyclone 24 is shown in FIG. 2. It has an impure gas inlet 17, a swirl assembly 18 (guide vane ring), a central body 19 and at least two outlet ducts, three outlet ducts 20, 21 and 22 being present in the example.

A turbulent flow (potential vortex, solid-state vortex or a combination of the two) is imparted by the guide vane ring 18 to the gas flowing in in the direction of the arrows 11. In this centrifugal field, suspended matter having a relatively high mass or relatively high specific gravity is carried outward. A flow field is generated, in which suspended matter is sorted according to mass over the radius. The suspended matter, separated according to mass, is led away via the outlet ducts 21 and 22. A vortex core is avoided by means of the central body 19, so as to avoid unclear flow conditions (very high velocities in the case of the potential vortex or very low velocities in the case of the solid-state vortex). The diameter and length of the guide vane ring 18, central body 19, tube 23 and outlet ducts 20–22 are critical for the functioning of the axial cyclone 24. These dimensions determine the separation accuracy and the size of the separated suspended matter. A pure gas 30 is thus formed in the axial cyclone 24 and is led away via the central outlet duct 20. A gas stream 31 laden with suspended matter of lower mass is led away via the outlet duct 21 and a gas stream 32 laden with suspended matter of higher mass is led away via the outlet duct 22. Valves or flaps, not illustrated, may be present in the three outlet ducts 20, 21 and 22, so that the throughput quantities can be regulated.

Since there is space available in the combustion chamber plenum 5 (FIG. 1), in one exemplary embodiment twenty to fifty such axial cyclones 24 could be arranged, distributed over the circumference, on a circular path, in each case one axial cyclone 24 supplying pure gas 30 to one or more guide vanes 15. In another exemplary embodiment, as indicated in FIG. 1, an axial cyclone 24' could also be located outside the casing 10. In such a case, the axial cyclone 24 could also be designed so as to be very much larger than the multiplicity of small axial cyclones 24.

At all events, the outlet duct 20 of the axial cyclone 24, said outlet duct receiving the pure gas 30, leads, for cooling purposes, to the interior of a guide vane 15 in the way initially mentioned. If an axial cyclone 24' located outside the casing 10 is used, the pure gas is delivered via the line 25 shown by dashes and dots, the pure gas being supplied from a tapping point 26 on the compressor 1. An outlet duct 20' receiving the pure gas 30 leads, in turn, into the interior of the guide vane 15, whereas, for example, a gas stream 31 laden with suspended matter of lower mass is led via an outlet duct 21' for the purpose of cooling the guide vane 13.

The advantages of using a larger number of small cyclone separators 24 are that the degree of separation rises with a decreasing cyclone diameter and that complicated distribution lines can be avoided.

Figure 3:
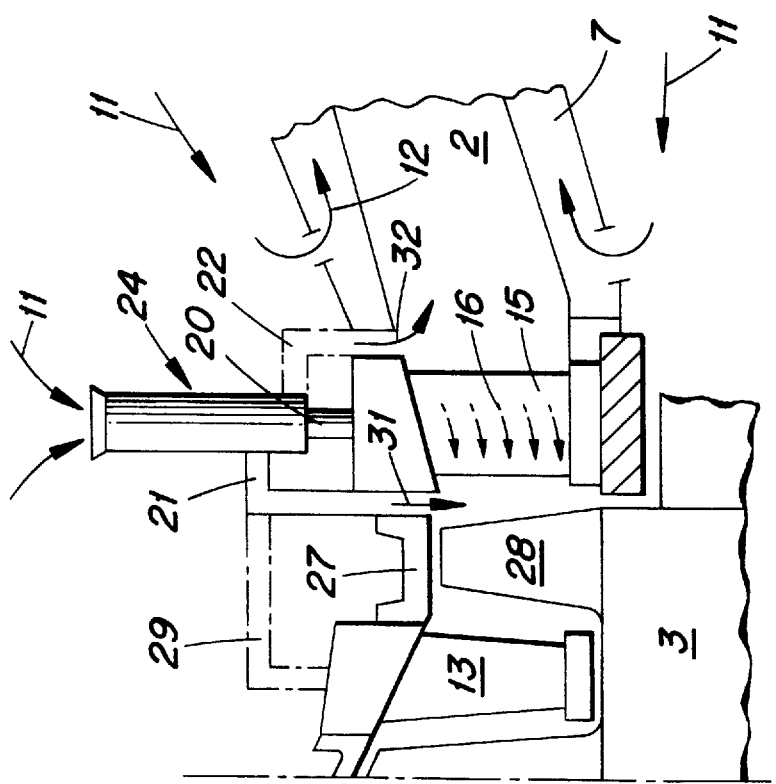
FIG. 3 shows a detail of the gas turbine plant in FIG. 1, with various ways of using the axial cyclone.

The gas streams 32, 31 led away via the outlet ducts 22 and 21 and laden to a greater or lesser extent with suspended matter can be used in various ways. In the example according to FIG. 1, the outlet duct 21 leads into the cooling-air space 7. FIG. 3 shows three other examples of the use of the gas streams 31, 32 laden with suspended matter. Thus, for example, a gas stream 32 laden with suspended matter of higher mass may be guided directly into the combustion chamber 2 via the outlet duct 22. In another example, a gas stream 31 laden with suspended matter of lower mass is used, via the outlet duct 21 between the guide vanes 15 and a heat shield 27, for cooling the moving blades 28 of the first rotor of the turbine 3. In the third example, the gas stream 31 laden with suspended matter of lower mass is led, via the outlet duct 21 and via a further outlet duct 29, to the guide vanes 13 of the second stage, in order, here, to achieve vane cooling insensitive to dust.

In the example according to FIGS. 1 and 3, the first guide wheel having the guide vanes 15 is followed by the first rotor of the turbine 3 having the moving blades 28. In another example which is not illustrated, the combustion chamber 2 could be followed by a second combustion chamber, so that, in such an example, the turbine therefore consists only of the first guide wheel having the guide vanes 15 and of a downstream rotor which is followed by the second combustion chamber.

The method according to the invention can be used, for example, in stationary gas turbine plants, in which the film bores in the guide vanes of the first guide wheel have a diameter of about 0.8 mm. The method according to the invention may, however, also be used in a gas turbine plant in an aircraft, in which the film bores in the guide vanes of the first guide wheel then have a diameter of about 0.3 mm to 0.5 mm.

The axial cyclone has only a few structural parts of simple design. It possesses no moving structural parts and can have small dimensions. It can therefore also be exposed to high temperatures and be placed in large numbers in the combustion chamber plenum 5, very near to the guide vane heads. Short flow paths of the pure gas 30 are thereby achieved.

Numerous modifications and variations of the present invention are possible in light of the above teachings. It is therefore to be understood that, within the scope of the appended claims, the invention may be practiced otherwise than as specifically described herein.

What is claimed is as new and desired to be secured by Letters Patent of the United States is:

1. A method for the cooling of guide vanes in a gas turbine plant comprising the steps of:

provoiding a compressor, at least one combustion chamber, at least one turbine having at least one first guide wheel with guide vanes, and at least one dust separator;

supplying part of an impure gas flowing through the compressor to the at least one dust separator, the impure gas including suspended matter;

separating suspended matter from the impure gas by centrifugal force with the at least one dust separator, so that a pure gas is formed;

guiding the pure gas into the interior of the guide vanes of the at least one first guide wheel; and guiding a gas separated in the at least one dust separator and laden with suspended matter to a location in the turbine selected from the group consisting of:
(a) a cooling-air space surrounding the combustion chamber; and
(b) directly into the combustion chamber.

2. The method as claimed in claim 1, wherein the step of providing comprises providing an axial cyclone as the at least one dust separator.

3. The method as claimed in claim 1, wherein the step of providing comprises providing a guide wheel having guide vanes and a rotor having moving blades, which are both located between a first combustion chamber and a second combustion chamber downstream of the latter.

4. The method as claimed in one of claim 1, wherein the guiding step comprises guiding the gas separated in the dust separator and laden with suspended matter through an outlet duct between the guide vanes of the first guide wheel and a heat shield and to the moving blades of the first rotor.

5. The method as claimed in claim 1, wherein the step of providing comprises providing a further guide wheel downstream of the vanes of the first guide wheel, and wherein the step of guiding a gas separated in the at least one dust separator and laden with suspended matter comprises guiding the laden gas into the interior of the guide vanes of the further guide wheel.

6. The method as claimed in claim 1, wherein said providing step comprises providing in a stationary gas turbine plant, and providing the guide vanes of the first guide wheel with film bores of a diameter of about 0.8 mm.

7. The method as claimed in claim 1, wherein said providing step comprises providing in a gas turbine plant in an aircraft, and providing the guide vanes of the first guide wheel with film bores of a diameter of about 0.3 mm to 0.5 mm.

* * * * *